(12) United States Patent
Forsyth et al.

(10) Patent No.: US 9,163,188 B2
(45) Date of Patent: Oct. 20, 2015

(54) SEPARATION OF CARBON DIOXIDE AND HYDROGEN

(75) Inventors: Jonathan Alec Forsyth, Newbury (GB); Yasushi Mori, Hiroshima (JP); Kazumasa Ogura, Tokyo (JP)

(73) Assignees: BP Alternative Energy international Limited (GB); Mitsubishi Heavy Industries Limited (JP)

( * ) Notice: Subject to any disclaimer, the term of this patent is extended or adjusted under 35 U.S.C. 154(b) by 475 days.

(21) Appl. No.: 13/386,692

(22) PCT Filed: Jul. 23, 2010

(86) PCT No.: PCT/GB2010/001406
§ 371 (c)(1),
(2), (4) Date: Jan. 24, 2012

(87) PCT Pub. No.: WO2011/010112
PCT Pub. Date: Jan. 27, 2011

(65) Prior Publication Data
US 2012/0118010 A1 May 17, 2012

(30) Foreign Application Priority Data

Jul. 24, 2009 (WO) ................ PCT/GB2009/001810
Oct. 6, 2009 (WO) ................ PCT/GB2009/002383
Dec. 16, 2009 (WO) ................ PCT/GB2009/002884
Dec. 16, 2009 (WO) ................ PCT/GB2009/002895

(51) Int. Cl.
*C10K 1/00* (2006.01)
*B01D 53/00* (2006.01)
(Continued)

(52) U.S. Cl.
CPC .............. *C10K 1/005* (2013.01); *B01D 53/002* (2013.01); *C01B 3/16* (2013.01); *C01B 3/34* (2013.01);
(Continued)

(58) Field of Classification Search
CPC ...... F25J 3/0625; F25J 3/0675; F25J 2220/84; F25J 2270/20; B01D 53/1462; B01D 53/1468
USPC ........................ 62/617, 625, 636; 95/183, 286
See application file for complete search history.

(56) References Cited

U.S. PATENT DOCUMENTS 3,435,590 A * 4/1969 Smith ............................. 95/174
3,614,872 A 10/1971 Tassoney
(Continued)

FOREIGN PATENT DOCUMENTS

EP 2 149 769 A1 2/2010
WO WO 2009013455 A2 * 1/2009

*Primary Examiner* — John F Pettitt
*Assistant Examiner* — Tareq Alosh
(74) *Attorney, Agent, or Firm* — Gunnar Heinisch

(57) ABSTRACT

A process is described for separating a gas stream containing hydrogen sulfide ($H_2S$) impurities into a hydrogen ($H_2$) rich vapor stream, a carbon dioxide ($CO_2$) stream and an $H_2S$ rich vapor stream in an apparatus that comprises a compression and/or cooling system comprising at least one compressor and/or heat exchanger and a gas-liquid separator vessel, and an $H_2S$ recovery unit. In examples, the process comprises the steps of: (a) feeding the gas stream to the compression and/or cooling system such that carbon dioxide in the gas stream condenses to form a two-phase stream; (b) passing the two-phase stream either directly or indirectly to a gas-liquid separator vessel and withdrawing a hydrogen rich vapor stream and a liquid $CO_2$ stream containing dissolved $H_2S$ impurities from the separator vessel; (c) passing the liquid $CO_2$ stream containing dissolved $H_2S$ impurities to an $H_2S$ recovery unit comprising an evaporator/condenser in which the $CO_2$ and $H_2S$ are vaporized and an $H_2S$ absorber in which the gaseous $H_2S$ and $CO_2$ are separated, wherein the two phase stream passed to the separator is at a pressure of from 80 bar to 400 bar. In some applications, the pressure of the $H_2S$ recovery unit is at least 30 bar. In a preferred example, residual $CO_2$ in the hydrogen rich vapor stream is removed in an optional step by solvent extraction in a $CO_2$ absorber most preferably in a configuration where the $H_2S$ and $CO_2$ absorbers share the same (preferably methanol) solvent.

18 Claims, 2 Drawing Sheets

Figure 1:
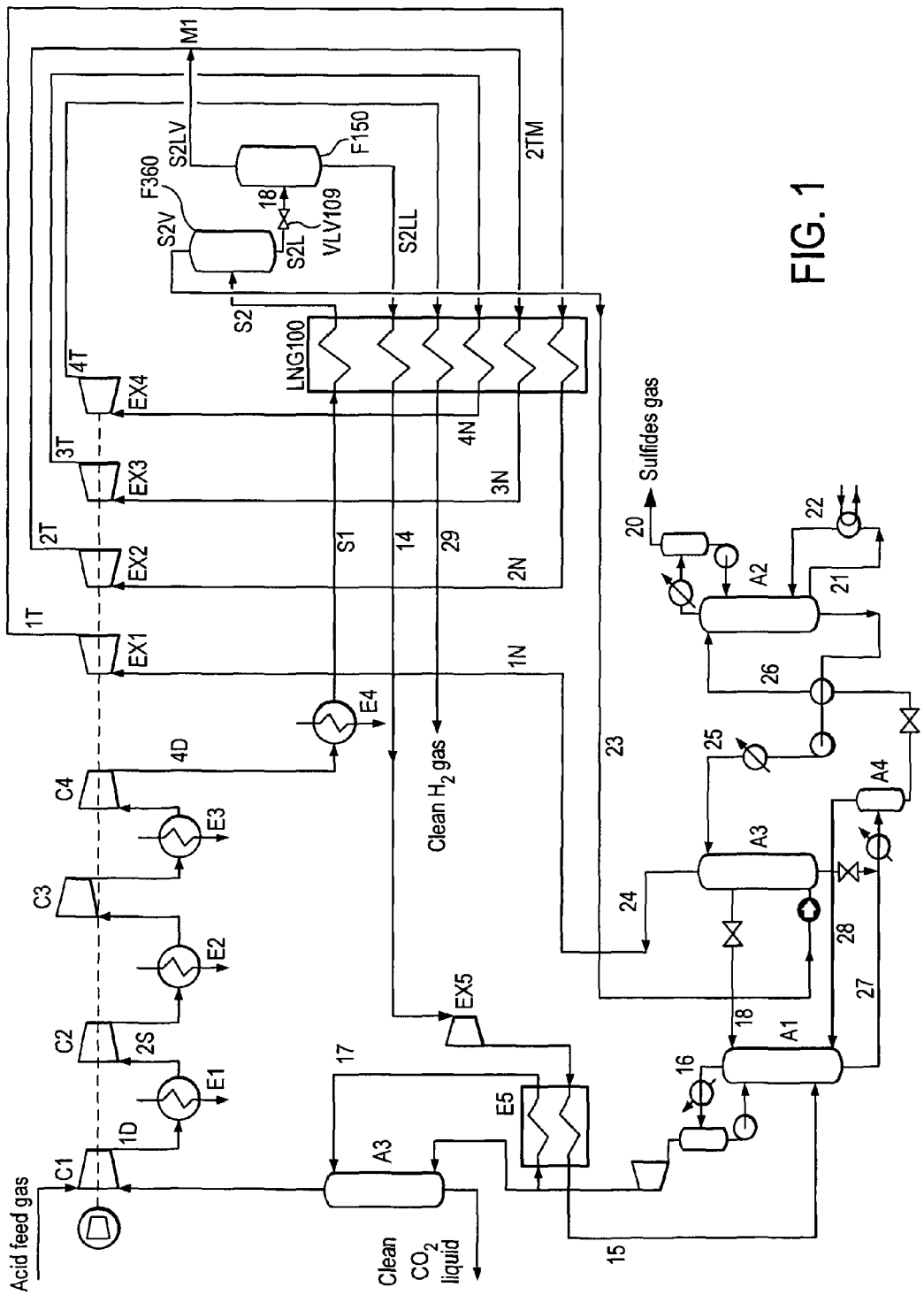

(51) Int. Cl.
*C01B 3/16* (2006.01)
*C01B 3/34* (2006.01)
*C01B 3/50* (2006.01)
*C01B 3/52* (2006.01)
*C01B 17/16* (2006.01)
*C10K 1/16* (2006.01)
*F25J 3/06* (2006.01)
*B01D 53/14* (2006.01)

(52) U.S. Cl.
CPC . *C01B 3/506* (2013.01); *C01B 3/52* (2013.01); *C01B 17/167* (2013.01); *C10K 1/004* (2013.01); *C10K 1/165* (2013.01); *F25J 3/067* (2013.01); *F25J 3/0625* (2013.01); *F25J 3/0655* (2013.01); *B01D 53/1462* (2013.01); *B01D 53/1468* (2013.01); *B01D 2257/304* (2013.01); *B01D 2257/504* (2013.01); *C01B 2203/0283* (2013.01); *C01B 2203/046* (2013.01); *C01B 2203/0415* (2013.01); *C01B 2203/0475* (2013.01); *C01B 2203/0485* (2013.01); *C01B 2203/0495* (2013.01); *C01B 2203/0883* (2013.01); *C01B 2203/0894* (2013.01); *C01B 2203/84* (2013.01); *F25J 3/0675* (2013.01); *F25J 2205/40* (2013.01); *F25J 2205/50* (2013.01); *F25J 2210/04* (2013.01); *F25J 2220/82* (2013.01); *F25J 2220/84* (2013.01); *F25J 2230/30* (2013.01); *F25J 2245/02* (2013.01); *F25J 2270/06* (2013.01); *F25J 2270/20* (2013.01); *Y02C 10/12* (2013.01)

(56) References Cited

U.S. PATENT DOCUMENTS

| | | | |
|---|---|---|---|
| 4,383,841 A | 5/1983 | Ryan et al. | |
| 4,548,620 A * | 10/1985 | Albiol | 95/174 |
| 6,276,172 B1 * | 8/2001 | Rottman et al. | 62/653 |
| 6,301,927 B1 | 10/2001 | Reddy | |
| 2007/0221541 A1 | 9/2007 | McClanahan | |
| 2008/0173584 A1 * | 7/2008 | White et al. | 210/656 |
| 2010/0126180 A1 * | 5/2010 | Forsyth et al. | 60/780 |

* cited by examiner

SEPARATION OF CARBON DIOXIDE AND HYDROGEN

This application is the U.S. national phase of International Application No. PCT/GB2010/001406 filed 23 Jul. 2010 which designated the U.S. and claims priority to British Application Nos. PCT/GB2009/001810, PCT/GB2009/002383, PCT/GB2009/002895, and PCT/GB2009/002884 filed 24 Jul. 2009, 6 Oct. 2009, 16 Dec. 2009, and 16 Dec. 2009, the entire contents of each of which are hereby incorporated by reference.

This invention relates to the separation of a condensable gas, for example carbon dioxide, from a gas mixture. Examples of the invention relate to the recovery of carbon dioxide and hydrogen in a concentrated form from a synthesis gas stream comprising hydrogen and carbon dioxide thereby generating a carbon dioxide stream that may be used in a chemical process, or may be sequestered or used for enhanced oil recovery before being ultimately sequestered, and a hydrogen stream that may be used as fuel for a power plant thereby generating electricity or as fuel for a low pressure burner of a fired heater, or as fuel for a reformer or boiler or as a refinery feed stream for upgrading of one or more refinery streams or as a hydrogen feed to a chemical process. In particular examples this invention relates to a process in which the synthesis gas stream contains significant levels of sulfide impurities such as hydrogen sulfide.

U.S. Pat. No. 3,614,872 relates to an autorefrigeration process for separating a shifted synthesis gas feedstream into an enriched carbon dioxide product stream and an enriched hydrogen product stream comprising the steps of:

(1) cooling the shifted synthesis gas feedstream stepwise at super atmospheric pressure by noncontact counter flow heat exchange in a plurality of separate cooling zones, and where in each separate cooling zone one or two streams of coolant of different compositions which are produced subsequently in the process is passed in heat exchange relationship with one stream of synthesis gas feed thereby cooling the synthesis gas feedstream to a temperature below the dew point at the pressure of the synthesis gas feedstream, and where in at least one of the separate cooling zones, the synthesis gas flows in split streams, each split stream of which is cooled by separate product streams of different compositions out of heat exchange with each other, and separating in a gas-liquid separation zone a liquefied enriched carbon dioxide product stream and a gaseous enriched hydrogen product stream;

(2) withdrawing at least a portion of said liquefied enriched carbon dioxide product stream from the separation zone in (1), expanding at substantially the temperature at which it is removed from separation zone and passing said expanded portion through at least one cooling zone in (1) as one of said stream of coolant at reduced pressure relative to said separation zone, and removing the enriched carbon dioxide product stream departing from (1) in gaseous phase at a temperature higher than that in said separation zone;

(3) simultaneously withdrawing at least a portion of said gaseous enriched hydrogen product stream from the separation zone of (1) and passing said portion as said other stream of coolant through at least one cooling zone in (1) which is separate and distinct from any cooling zone cooled in (2) by said first stream of coolant; and (4) withdrawing the gaseous enriched hydrogen product stream from (3) at a temperature higher than the temperature in said separation zone.

According to the description of U.S. Pat. No. 3,614,872, the dried feed gas enters the separating portion of the system at substantially initial line pressure, that is a pressure of about 1400 psig (96.5 barg). It is also said that at start-up, back pressure valve 20 is closed and the enriched hydrogen product stream from the top of separator 19 is reduced in pressure from 1400 psig to about 140 psig (9.65 barg) by being passed across an expansion valve. By expansion across the valve, the temperature of this gaseous stream is dropped to −78° F. without solid formation. The cooled enriched hydrogen product gas is then used as internal refrigerant in cooler 13. It is also said that higher refrigeration efficiencies are possible if the compressed hydrogen enriched product gas instead of being expanded at constant enthalpy through a valve, is expanded at constant entropy; that is, the gas is made to operate an expansion engine or move the rotor of a turboelectric generator. However, after start-up, it may no longer be necessary to supply refrigerant to cooler 13 at a temperature of −78° F. Accordingly, the hydrogen enriched product gas may by-pass the expansion valve and is introduced into the cooler 13 at a temperature of about −55 to −65° F. This scheme is said to avoid the large pressure drop previously experienced across the expansion valve.

Our co-pending European patent application 08252610.4 filed on 31 Jul. 2008 discloses a process which comprises pressurising the synthesis gas stream in a compression system to a pressure in the range of 150 to 400 barg and then passing the compressed synthesis gas feed stream through a heat exchanger system in heat exchange relationship with a plurality of internal refrigerant streams that are produced subsequently in the process, so that the high pressure (HP) synthesis gas stream that exits the heat exchanger system may be cooled to a temperature in the range of −15 to −55° C. The cooled HP synthesis gas that exits the heat exchanger system is then e separated in a gas-liquid separator vessel with negligible pressure drop across the heat exchanger system and separator vessel thereby forming a HP hydrogen ($H_2$) rich vapour stream and a HP liquid carbon dioxide ($CO_2$) stream with the separation achieving 75% to 95% capture of the $CO_2$ from the synthesis gas feed stream. The HP $H_2$ rich vapour stream may then be reduced in pressure to any desired pressure by passing it through a turboexpansion system that comprises a plurality of turboexpanders arranged in series. In particular, hydrogen rich vapour stream may be obtained at the desired fuel gas feed pressure for a combustor of a gas turbine of a power plant (for example, at a pressure of 30 barg). It is also taught that the expanded $H_2$ rich vapour streams that exit each turboexpander of the series may be used as internal refrigerant streams thereby providing a major portion of the refrigeration duty for the heat exchanger system. Also, expansion of the $H_2$ rich vapour in the turboexpanders may be used to drive a rotor or shaft of the compressor(s) of the compressor system or to drive the rotor or shaft of a turbo-electric generator thereby achieving a net power consumption for the separation of the synthesis gas stream into a hydrogen rich vapour stream and liquid $CO_2$ stream of less than 30 MW, preferably, less than 25 MW when processing 28,000 kmol/hour of syngas containing 56 mol % hydrogen and 43 mol % $CO_2$.

It has now been found that the process described in our earlier patent application can be adapted to treat synthesis gas containing hydrogen sulfide impurities by concentrating the hydrogen sulfide in the HP liquid $CO_2$ stream, vaporising said stream and separating the components by solvent extraction. This has the advantage that no upstream treatment of the synthesis gas stream to remove hydrogen sulfide is required which generally speaking is less energy efficient.

Thus, according to the present invention there is provided a process for separating a synthesis gas stream containing hydrogen sulfide ($H_2S$) impurities into a hydrogen ($H_2$) rich vapour stream, a liquid carbon dioxide ($CO_2$) stream and an $H_2S$ rich vapour stream in a $CO_2$ condensation plant that comprises (a) a compression system comprising at least one compressor, (b) a heat exchanger system, (c) a gas-liquid separator vessel, (d) a turboexpansion system comprising a plurality of turboexpanders arranged in series and (e) an $H_2S$ recovery unit the process comprising the steps of:

(A) feeding the synthesis gas stream at a pressure in the range of 10 to 60 barg to the compression system of the $CO_2$ condensation plant such that the synthesis gas is increased in pressure to a pressure in the range of 80 to 400 barg, for example 150 to 400 barg; and cooling the resulting high pressure (HP) synthesis gas stream against an external coolant and optionally an external refrigerant to remove at least part of the heat of compression;

(B) cooling the HP synthesis gas stream formed in step (A) to a temperature in the range of −15 to −55° C. by passing the HP synthesis gas stream through the heat exchanger system in heat exchange relationship with a plurality of internal refrigerant streams wherein the internal refrigerant streams are selected from the group consisting of cold hydrogen rich vapour streams and liquid $CO_2$ streams;

(C) passing the cooled HP synthesis gas stream formed in step (B) either directly or indirectly to a gas-liquid separator vessel that is operated at substantially the same pressure as the heat exchanger system and withdrawing a high pressure (HP) hydrogen rich vapour stream from at or near the top of the separator vessel and a high pressure (HP) liquid $CO_2$ stream containing dissolved $H_2S$ impurities from at or near the bottom of the separator vessel;

(D) feeding the HP hydrogen rich vapour stream from step (C) to the turboexpansion system wherein the hydrogen rich vapour stream is subjected to isentropic expansion in each of the turboexpanders of the series such that hydrogen rich vapour streams are withdrawn from the turboexpanders of the series at reduced temperature and at successively reduced pressures and wherein isentropic expansion of the hydrogen rich vapour in each of the turboexpanders of the series is used to drive a compressor of the compression system and/or to drive a turbine of an electric generator and (E) passing the HP liquid $CO_2$ stream containing dissolved $H_2S$ impurities from step (C) to the $H_2S$ recovery unit comprising an evaporator/condenser in which the $CO_2$ and $H_2S$ are vaporised and an $H_2S$ absorber in which the gaseous $H_2S$ and $CO_2$ are separated.

Figure 2:
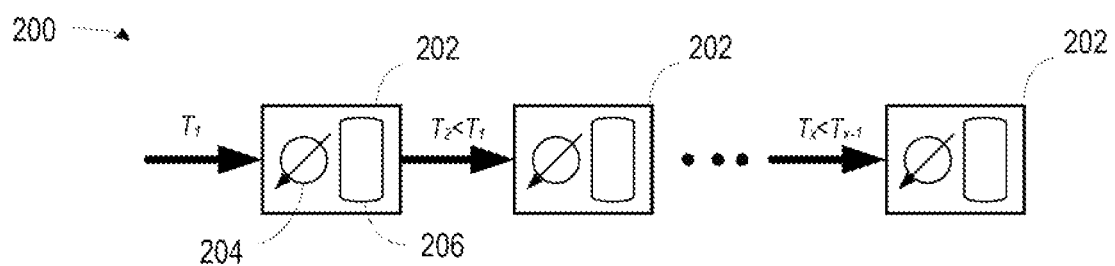

Preferably, the cooled HP synthesis gas stream formed in step (B) is passed to a cryogenic separation system 200 such as is shown in FIG. 2 comprising at least one cryogenic separation stage 202 wherein the cryogenic separation stage(s) 202 is comprised of a heat exchanger 204 that employs an external refrigerant (not shown) and a gas-liquid separator vessel 206. Accordingly, the gas-liquid separator vessel employed in step (C) of the present invention may be either the gas-liquid separator vessel of a single cryogenic separation stage that employs an external refrigerant or is the final gas-liquid separator vessel of a series of cryogenic separation stages wherein the cryogenic separation stages each employ an external refrigerant and are operated at progressively lower temperatures.

An advantage of the process of the present invention is that at least 50%, for example at least 70%, is separated from the gas stream at the gas-liquid separator. An advantage of the process of aspects of the present invention is that at least 75%, preferably, at least 90%, more preferably, at least 95% of the carbon dioxide is separated from the synthesis gas feed stream with the carbon dioxide capture level being dependent upon the pressure of the HP synthesis gas stream and on whether the cooled synthesis gas stream formed in step (B) is subjected to cryogenic cooling against an external refrigerant. Thus, it has been found that 75 to 85% of the $CO_2$ may be captured from the synthesis gas feed stream if the cooled HP synthesis gas stream that is formed in step (B) is passed directly to a gas-liquid separator vessel without being subjected to cryogenic cooling against an external refrigerant (the $CO_2$ capture level increasing with increasing compression of the synthesis gas feed stream). The person skilled in the art will understand that the $CO_2$ capture level increases with increasing compression of the synthesis gas feed stream above the minimum pressure of 80 barg. In some examples the pressure will be 150 barg or more. The person skilled in the art will also understand that the $CO_2$ capture level will depend on the temperature to which the HP synthesis gas stream is cooled in the heat exchanger system and optional cryogenic separation system.

In examples of the invention, the work of the expander is increased through higher carbon dioxide separation and thus higher carbon dioxide scrubbed gas stream pressure. The inventors have identified that using higher separation pressure, the balance of heat duty can be attained between cooling down the compressed gas and the cold heat generated by the high pressure hydrogen rich gas expander in view of the higher carbon dioxide separation rate. It has been found for some examples that it is advantageous for the pressure of the separation step at the gas-liquid separator to be carried out at 150 bar to 400 bar. In some cases, such pressure can lead to a carbon dioxide separation rate in the range of 80 to 90%.

Preferably a carbon dioxide scrubber is provided downstream of the separator. Preferably the scrubber operates at a pressure of greater than 50 bar, preferably greater than 60 bar. Preferably the scrubber operates at a pressure of between 80 and 400 bar.

Using a high pressure and low temperature separation and supplementary scrubber (for example a physical solvent), can lead to efficiencies. For example, for a physical scrubber, the required solvent flow rate can decrease as pressure is increased, temperature is decreased and/or the amount of the scrubbed component decreases. In examples of the invention therefore, the solvent flow rate can be reduced compared with conventional systems. Thus energy consumption can also be reduced. Since the size of the scrubber may be dependent on the volumetric gas flow, the use of high pressure and low temperature can allow a smaller scrubber to be used.

In examples using a high pressure and low temperature separation and supplementary physical scrubber, high carbon dioxide recovery can be achieved together with recovery of H2S in liquid form. In accordance with aspects of the invention, the same physical absorbent as used for the physical scrubber can be used to scrub vaporized H2S from vaporized CO2.

A further advantage of the present invention is that typically, at least 98%, preferably, at least 99%, more preferably, at least 99.5%, in particular, at least 99.8% of the hydrogen is recovered in the $H_2$ rich vapour stream. Yet a further advantage of the process of the present invention is that the hydrogen rich vapour stream that is separated in step (C) is at a pressure substantially above the minimum fuel gas feed pressure (inlet pressure) for a combustor(s) of at least one gas turbine(s) of a power plant. Accordingly, the HP hydrogen rich vapour stream may be reduced in pressure in step (D) to the desired inlet pressure for the combustor(s) of the gas turbine(s) by isentropically expanding the HP hydrogen rich vapour stream in a series of turboexpanders thereby providing cold $H_2$ rich vapours streams (internal refrigerant streams) that may be used to cool the HP synthesis gas stream in step (B). In addition, isentropic expansion of the hydrogen rich vapour streams in each of the turboexpanders of the series produces work that may be used to either drive the compressor(s) of the compression system or to drive at least one turbine of an electric motor thereby generating electricity for use in the process (for example, for operating one or more electric compressors of the compression system). Thus, a major portion of the compression energy may be recovered using the turboexpanders thereby increasing the overall energy efficiency of the process. However, it is recognised that there will be energy losses and that additional power will be required to run the compressors of the compression system. It is also recognised that the HP hydrogen rich vapour stream may be expanded to pressures below the inlet pressure of the combustor of a gas turbine, if the hydrogen rich vapour stream is to be used for a different purpose, for example, as fuel for a low pressure burner of a fired heater, or as fuel for a reformer or boiler or as a refinery feed stream for upgrading of one or more refinery streams or as a hydrogen feed to a chemical process.

A still further advantage of the present invention is that essentially all sulfide impurities present in the synthesis gas can be concentrated in the HP liquid $CO_2$ stream thereby making it is easier to separate and dispose of. This is especially important where the $CO_2$ will be sequestered underground and needs to be freed of environmentally damaging contaminants. Although the term hydrogen sulfide ($H_2S$) is used throughout this specification as it is by far the most common impurity one of ordinary skill would understand this term to cover all volatile sulfur containing contaminants likely to be found in industrially produced synthesis gas including mixtures of $H_2S$ with lesser amounts of the volatile mercaptans.

The synthesis gas feed stream may be generated from a solid fuel such as petroleum coke or coal in a gasifier or from a gaseous hydrocarbon feedstock in a reformer. The synthesis gas from the gasifier or reformer contains high amounts of carbon monoxide. Accordingly, the synthesis gas is treated in a shift converter unit where substantially all of the carbon monoxide contained in the synthesis gas stream is converted to carbon dioxide over a shift catalyst according to the water gas shift reaction (WGSR)

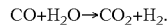

$$CO + H_2O \rightarrow CO_2 + H_2.$$

The shift converter unit may be a single shift reactor containing a shift catalyst. However, it is preferred that the shift converter unit comprises a high temperature shift reactor containing a high temperature shift catalyst and a low temperature shift reactor containing a low temperature shift catalyst. The water gas shift reaction is exothermic and results in a significant temperature rise across the shift converter unit. Accordingly, the shift converter unit may be cooled by continuously removing a portion of the shifted synthesis gas stream and cooling this stream by heat exchange with one or more process streams, for example against boiler feed water or against steam (for the generation of superheated steam).

The synthesis gas that exits the shift converter unit comprises primarily hydrogen, carbon dioxide and steam and minor amounts of $H_2S$, carbon monoxide and methane. Typically, the synthesis gas that exits the shift converter unit is cooled to a temperature in the range of 30 to 50° C., for example, about 40° C., upstream of the $CO_2$ condensation plant, by heat exchange with at least one cold process stream, to condense out a condensate (predominantly comprised of water). Typically, the cold process stream is a process stream used during the generation of the synthesis gas. The condensate is then separated from the cooled synthesis gas stream, for example, in a condensate drum.

After removal of any condensate (see above), the synthesis gas stream is preferably dried prior to being passed to the $CO_2$ condensation plant, as any moisture in the synthesis gas stream will freeze and potentially cause blockages in the plant. The synthesis gas stream may be dried by being passed through a molecular sieve bed or an absorption tower that employs a solvent, for example, triethylene glycol, to selectively absorb the water. Preferably, the dried synthesis gas stream has a water content of less than 1 ppm (on a molar basis).

The synthesis gas stream is then fed to the compression system of the $CO_2$ condensation plant at a pressure in the range 10 to 60 barg, preferably, 20 to 60 barg, in particular, 40 to 60 barg. The temperature at which the synthesis gas is fed to the compression system of the $CO_2$ condensation plant is not critical. However, it is preferred that the synthesis gas stream is fed to the compression system of the $CO_2$ condensation plant at a temperature in the range of 25 to 50° C., for example, 30 to 40° C. The synthesis gas stream is then compressed, in the compression system, to a pressure in the range of 80 to 400 barg, for example 150 to 400 barg, preferably, 175 to 360 barg, more preferably, 250 to 360 barg, most preferably 300 to 360 barg, in particular, 330 to 360 barg. Preferably, the compression system is a multistage compressor system comprising a plurality of compressors arranged in series. However, where the synthesis gas feed stream is compressed to lower pressures, for example, pressures in the range of 80 barg, 150 to 200 barg or less, preferably, 150 to 180 barg, a single stage of compression may be employed. Thus, a multistage compression system is preferred for higher discharge pressures from the compression system and is optional for lower discharge pressures from the compression system. Generally, the compressor(s) of the compression system is mounted on a shaft that may be driven by an electric motor, gas turbine or steam turbine. Alternatively, the compressor(s) of the compression system and the turboexpanders of the turboexpansion system may be mounted on a common shaft so that the isentropic expansion of the hydrogen rich vapour in the turboexpanders may be used to drive the compressor(s).

A typical multistage compression system for use in the process of the present invention comprises at least one low pressure (LP) compressor, preferably two or three LP compressors mounted on a common drive shaft and at least one high pressure (HP) compressor, preferably one or two HP compressors mounted on a further common drive shaft (the drive shafts may be connected via a gear system). The LP and HP compressors are arranged in series. As would be well known to the person skilled in art, increased compression efficiency is achieved by balancing the compression duty across the compressors of the series. Thus, it is preferred that the compression ratios between successive compressors of the series are substantially the same.

Typically, the compressed HP synthesis gas stream is cooled to remove at least part, preferably, substantially all of the heat of compression before being passed through the heat exchanger system thereby reducing the cooling duty for the heat exchanger system. Where there is a single stage of compression, at least part of the heat of compression is removed from the HP synthesis gas by passing the HP synthesis gas stream through at least one heat exchanger of the compression system in heat exchange relationship with an external coolant and/or an external refrigerant. Where there are a plurality of stages of compression, it is preferred that the multistage compression system is provided with at least one interstage heat exchanger where the compressed gas is cooled against an external coolant before being passed to the next compressor in the series. Preferably, interstage heat exchangers are provided between each compressor in the series. The multistage compression system is also provided with at least one heat exchanger after the final stage of compression where the HP synthesis gas stream is cooled against an external coolant and/or an external refrigerant before being passed to the heat exchanger system. Typically, the compressed HP synthesis gas stream from the final stage of compression may be passed through a first heat exchanger in heat exchange relationship with an external coolant and then through a second heat exchanger in heat exchange relationship with an external refrigerant, prior to being passed to the heat exchanger system. Suitable external coolants for use in the heat exchanger(s) of the compression system include air, water, or a cold process stream such as the $H_2$ rich vapour stream formed in step (C) or the final $H_2$ rich vapour stream that is exported from the process of the present invention. Suitable external refrigerants for use in the heat exchanger of the compression system include propane, propenes and ammonia.

Where the HP synthesis gas that exits the compression system has not been heat exchanged with an external refrigerant, the HP synthesis gas typically exits the compression system at a temperature in the range of 20 to 50° C., in particular, 25 to 40° C. Where the HP synthesis gas that exits compression system has been heat exchanged with an external refrigerant, the HP synthesis gas typically exits the compression system at a temperature in the range of 0 to –30° C., for example, 0 to –10° C.

The HP synthesis gas stream is then passed through the heat exchanger system of the $CO_2$ condensation plant where the HP synthesis gas stream is cooled against a plurality of internal refrigerant streams i.e. cold process streams that are produced subsequently in the process. The internal refrigerant streams may be selected from cold hydrogen rich vapour stream(s), in particular, cold expanded hydrogen rich vapour stream(s) from the turboexpanders of the turboexpansion system, and liquid $CO_2$ stream(s). Typically, the HP synthesis gas stream is cooled in the heat exchanger system to a temperature in the range –15 to –55° C., preferably, –25 to –50° C., for example, –35 to –40° C. Typically, there is minimal pressure drop across the heat exchanger system, for example, a pressure drop of less than 1.5 bar, preferably, less than 1.0 bar.

Typically, the heat exchanger system comprises a multichannel heat exchanger with the HP synthesis gas stream being passed through a channel of a multichannel heat exchanger in heat exchange relationship with a plurality of internal refrigerant streams that are passed through further channels in the multichannel heat exchanger. As an alternative to pre-cooling the HP synthesis gas stream against an external refrigerant in a heat exchanger of the compression system, it is envisaged that one or more external refrigerant streams may be passed through yet further channels in the multichannel heat exchanger thereby providing additional cooling duty for the HP synthesis gas stream. Preferably, the HP synthesis gas stream is passed in a counter-current direction through the multichannel heat exchanger to the internal refrigerant stream(s) and optional external refrigerant stream(s).

Alternatively, the heat exchanger system may comprise a plurality of stand-alone or individual heat exchangers arranged in series wherein the heat exchangers of the series are operated at successively lower temperatures. Thus, the HP synthesis gas stream is cooled as it is passed through the series of heat exchangers by heat exchange with a plurality of internal refrigerant streams that are fed to the first and successive heat exchangers of the series at successively lower temperatures. It is also envisaged that the heat exchanger system may comprise a multichannel heat exchanger and one or more stand-alone heat exchangers with the stand-alone heat exchanger(s) arranged upstream and/or downstream of the multichannel heat exchanger. It is preferred that the HP synthesis gas stream is passed through the stand-alone heat exchanger(s) in a counter-current direction to the internal refrigerant stream(s) that are fed to the stand-alone heat exchanger(s).

The multichannel heat exchanger of the compression system may be of the type employed in processes for generating liquefied natural gas such as a brazed aluminium plate-fin heat exchanger or a diffusion-bonded heat exchanger. Alternatively, the multichannel heat exchanger may be a multiple body shell and tube heat exchanger comprising either (a) a tube arranged in the shell of the heat exchanger wherein the shell of the heat exchanger comprises a plurality of compartments and wherein the HP synthesis gas stream is passed through the tube and an internal refrigerant stream is passed through each compartment of the shell in heat exchange relationship with the HP synthesis gas that is flowing through the tube; or (b) a plurality of tubes arranged in the shell of the heat exchanger wherein the shell comprises a single compartment and the HP synthesis gas is passed through the compartment and an internal refrigerant stream is passed through each of the tubes in heat exchange relationship with the HP synthesis gas that is flowing through the single compartment of the shell. Accordingly, the term "channel" encompasses the channels formed between the plates of a brazed aluminium plate-fin heat exchanger or a diffusion-bonded heat exchanger and also the compartment(s) and tube(s) of a multiple body shell and tube heat exchanger.

The stand-alone heat exchanger(s) of the compression system may be of the shell and tube type (single body shell and tube heat exchanger(s)) with the HP synthesis gas stream passing through the tube side and an internal refrigerant stream passing through the shell side of the heat exchanger or vice versa. However, a process that employs stand-alone heat exchangers to pre-cool the HP synthesis gas stream will be of reduced efficiency compared with a process that employs a multichannel heat exchanger, in whole or in part, to cool the HP synthesis gas stream in step (B) of the present invention.

The cooled HP synthesis gas stream from the heat exchanger system is a two phase stream comprised of a liquid phase and vapour phase. There is a limit on the temperature to which the HP synthesis gas stream may be cooled in the heat exchanger system as the temperature must be maintained above a value where solid $CO_2$ will form. This typically occurs at a temperature of –56° C. (the triple point for pure $CO_2$ is at 5.18 bar and at a temperature of –56.4° C.) although the presence of $H_2$ may depress this freezing point. The amount of cooling that is achieved in the heat exchanger system owing to heat exchange with the plurality of internal refrigerant streams will be dependent upon the amount of cooling of the isentropically expanded hydrogen rich vapour streams that is achieved in the turboexpansion system which, in turn, is dependent on the pressure of the HP hydrogen rich vapour stream that is formed in step (C) and the pressure of the $H_2$ rich vapour stream that exits the final turboexpander of the turboexpansion system in step (D). The amount of electricity generated by the turboexpanders of the turboexpansion system will also be dependent on the extent to which the hydrogen rich vapour is subjected to isentropic expansion in the turboexpansion system which is also dependent on the pressure of the $H_2$ rich vapour stream formed in step (C) and the pressure of the $H_2$ rich vapour stream that exits the final turboexpander of the turboexpansion system in step (D).

The cooled synthesis gas stream from the heat exchanger system may be passed directly to a gas-liquid separator vessel that is preferably operated at substantially the same pressure as the heat exchanger system. Thus, the pressure drop across the separator vessel is typically in the range of 0.1 to 5 bar, preferably, 0.1 to 1 bar, in particular, 0.1 to 0.5 bar. Accordingly, a HP hydrogen rich vapour phase is withdrawn from at or near the top of the gas-liquid separator vessel and is passed to the turboexpander system while a HP liquid $CO_2$ stream containing dissolved $H_2S$ impurities is withdrawn from at or near the bottom of the gas-liquid separator vessel.

Where relatively high carbon capture levels are desired, for example, greater than 90%, preferably, greater than 95% $CO_2$ capture from the synthesis gas feed stream (based on the molar composition of the synthesis gas feed stream), and insufficient cooling of the HP synthesis gas has been achieved in the compression system and heat exchanger system, the cooled HP synthesis gas that exits the heat exchanger system may be passed to a cryogenic separation system of the $CO_2$ condensation plant wherein the cryogenic separation system comprises at least one cryogenic separation stage. The cryogenic separation stage(s) comprises a heat exchanger that employs an external refrigerant and a gas-liquid separator vessel. The cryogenic separation system is operated without any substantial reduction in pressure across the cryogenic separation stage(s). Where the cryogenic separation system comprises a single cryogenic separation stage, a HP hydrogen rich vapour stream and a HP liquid $CO_2$ stream containing dissolved $H_2S$ impurities are formed by: (i) passing the cooled HP synthesis gas that exits the heat exchanger system through the heat exchanger of the single cryogenic separation stage where it is cooled against an external refrigerant, (ii) passing the resulting cooled HP stream to the separator vessel of the single cryogenic separation stage where a $H_2$ rich vapour phase separates from a liquid $CO_2$ phase containing dissolved $H_2S$ impurities, and (iii) withdrawing a HP hydrogen rich vapour stream and a HP liquid $CO_2$ stream containing dissolved $H_2S$ impurities from the separator vessel of the single cryogenic separation stage. Where the desired carbon dioxide capture level cannot be achieved using a single cryogenic separation stage, a HP hydrogen rich vapour stream and a plurality of HP liquid $CO_2$ streams containing dissolved $H_2S$ impurities are formed by: (i) passing the cooled HP synthesis gas that exits the heat exchanger system through the first heat exchanger of a multistage cryogenic separation system where it is cooled against an external refrigerant, (ii) passing the resulting cooled HP stream to the separator vessel of the first cryogenic separation stage where a $H_2$ rich vapour phase separates from a liquid $CO_2$ phase containing dissolved $H_2S$ impurities, (iii) withdrawing a HP hydrogen rich vapour stream and a HP liquid $CO_2$ stream containing dissolved $H_2S$ impurities from the separator vessel of the first cryogenic separation stage, (iv) passing the HP hydrogen rich vapour stream through the heat exchanger of a further cryogenic separation stage where it is cooled against a further external refrigerant to below its dew point thereby forming a cooled two phase stream, (v) passing the cooled two phase stream to the separator vessel of the further cryogenic separation stage where a hydrogen rich vapour phase separates from a liquid $CO_2$ phase containing dissolved $H_2S$ impurities, and (vi) withdrawing a HP hydrogen rich vapour stream and a HP liquid $CO_2$ stream containing dissolved $H_2S$ impurities from the separator vessel of the further separation stage and (vii) if necessary, repeating steps (iv) to (vi) by passing the HP hydrogen rich vapour stream through one or more further cryogenic separation stages until the desired $CO_2$ capture has been achieved. Accordingly, the HP hydrogen rich vapour stream is removed from the gas-liquid separation vessel of the final cryogenic separation stage of the series.

Where the HP synthesis gas stream is cooled in the heat exchanger system to a temperature in the range of −30 to −40° C., for example, about −37° C., the cryogenic separation system may comprise a single cryogenic separation stage having an operating temperature in the range of −40 to −55° C., preferably, −45 to −50° C. Where the HP synthesis gas stream exits the heat exchanger system is at a higher temperature, for example, a temperature in the range of −15 to greater than −30° C., the cryogenic separation system may comprise a plurality of cryogenic separation stages that are arranged in series with the separator vessels of the cryogenic separation stages operated at successively lower temperatures. The operating temperature of each cryogenic separation stage will depend on the temperature to which the HP synthesis gas stream has been cooled in the heat exchanger system, the number of cryogenic separation stages and the desired carbon dioxide capture level. There is a limit on the lowest temperature in the final cryogenic separation stage, as the temperature must be maintained above a value where solid $CO_2$ will form (see above). Generally, the final cryogenic separation stage is operated at a temperature in the range of −40 to −55° C., preferably, −45 to −50° C.

Suitable external refrigerants that may be used as refrigerant in the heat exchanger(s) of the cryogenic separation stages(s) include propanes, ethane, ethylene, ammonia, hydrochlorofluorocarbons (HCFC's) and mixed refrigerants. Typical mixed refrigerants comprise at least two refrigerants selected from the group consisting of butanes, propanes, ethane, and ethylene. These refrigerants may be cooled to the desired refrigeration temperature in external refrigerant circuits using any method known to the person skilled in the art including methods known in the production of liquefied natural gas. These refrigerants may also be cooled to the desired refrigeration temperature by heat exchange with one or more cold isentropically expanded $H_2$ rich vapour streams from the turboexpanders of the turboexpansion system. The external refrigerant for the cryogenic separation stage is selected so as to achieve the desired operating temperature. For example, propane may be used as refrigerant when the feed temperature of the HP synthesis gas stream is in the range of −15 to greater than −30° C. and the desired operating temperature of the cryogenic separation stage is in the range of −20 to greater than −30° C. while ethane and/or ethylene may be used as external refrigerant when the feed temperature of the HP synthesis gas stream is in the range of −30 to −40° C. and the desired operating temperature for the cryogenic separation stage is in the range of −40 to −55° C., preferably, −45 to −50° C.

As discussed above, the cryogenic separation system is operated with minimal pressure drop across the cryogenic separation stage or stages of the system. Typically, the pressure drop across the cryogenic separation system is in the range of 1 to 5 bar, preferably, 1 to 3 bar, in particular, 1 to 2 bar. Thus, where there are a plurality of cryogenic separation stages, these may be operated at substantially the same pressure. However, higher pressure drops across the cryogenic separation system may be tolerated, for example, pressure drops in the range of 5 to 20 bar, preferably 5 to 10 bar.

In one embodiment prior to being fed to the turboexpansion system, the HP $H_2$ rich vapour stream formed in step (C) is used to cool the HP synthesis gas stream in step (B) by passing the cold HP $H_2$ rich vapour stream through a further channel in the multichannel heat exchanger (or through a stand-alone heat exchanger) in heat exchange relationship with the HP synthesis gas stream. Alternatively the HP $H_2$ rich vapour stream may be used as coolant for the heat exchanger(s) of the compression system.

In a another preferred embodiment the HP $H_2$ rich vapour stream is fed to a $CO_2$ absorber in which it is contacted with a solvent which absorbs any residual $CO_2$ and $H_2S$ contained therein. The treated HP $H_2$ rich vapour stream is thereafter either fed to the turboexpansion system directly or via the multichannel heat exchanger described above. Finally the $CO_2$ absorber described above can advantageously be integrated with the $H_2S$ absorber through use of a shared solvent which allows the extracted $CO_2$ to be combined with that previously separated. Solvent extraction is typically effected at the $H_2$ rich vapour streams delivery pressure and a low temperature e.g. −20 to −75° C. using a methanol or glycol ether solvent (see below).

The HP $H_2$ rich vapour stream that is fed to the turboexpansion system is at elevated pressure. Accordingly, the $H_2$ rich vapour stream is reduced in pressure to the desired exit pressure by being passed through the series of turboexpanders of the expansion system. The expansion energy recovered from the $H_2$ rich vapour streams in the turboexpanders can be used to drive an electric turbine or can be used to directly drive the compressors of the compressor system. As discussed above, isentropic expansion of the $H_2$ rich vapour stream results in significant cooling. Where one or more, preferably all, of the cold isentropically expanded hydrogen rich vapour streams that are withdrawn from the turboexpanders of the turboexpansion system are used to cool the HP synthesis gas stream in step (B), the operating pressures of the turboexpanders are set to optimise the expander efficiency and to ensure the discharge temperatures for the expanded $H_2$ rich vapour streams do not fall below −56° C. (the freezing point of $CO_2$). Typically, the discharge temperatures of the expanded streams are in the range of −15° C. to −50° C., preferably, −20° C. to −50° C., in particular, −30 to −50° C. However, it is also envisaged that one or more of the cold isentropically expanded hydrogen rich vapour streams may be used as an internal refrigerant for a different purpose, for example, to cool an external refrigerant (such as propane or ethane) that is employed in the process or to cool a non-isentropically expanded $H_2$ rich vapour stream so that it can be used as internal refrigerant in the process of the present invention. As there is no risk of forming solidified $CO_2$ when an internal refrigerant is used for these purposes, the discharge temperature of the expanded stream may be below −55° C.

Where the HP synthesis gas stream that exits the heat exchanger system is either passed directly to a gas-liquid separator vessel or is passed to a cryogenic separation system that comprises a single cryogenic separation stage, a single liquid $CO_2$ stream containing dissolved $H_2S$ impurities is obtained. Likewise, where the HP synthesis gas stream that exits the heat exchanger system is passed to a cryogenic separation system that employs a plurality of cryogenic separation stages, a separate liquid $CO_2$ stream containing dissolved $H_2S$ impurities will be obtained from each cryogenic separation stage. Preferably, the liquid $CO_2$ streams containing dissolved $H_2S$ impurities from the plurality of cryogenic separation stages are combined to form a combined liquid $CO_2$ stream containing dissolved $H_2S$ impurities.

In step (E) of the process, the liquid $CO_2$ stream or combined liquid $CO_2$ stream containing dissolved $H_2S$ impurities is next fed to an evaporator/condenser through expander where it is returned to gaseous form by expansion and heating. Preferably before doing so it is used as internal refrigerant in the heat exchanger system thereby providing further cooling for the HP synthesis gas feed stream in step (B). The evaporator/condenser used is suitably one which allows the liquid $CO_2$ stream containing dissolved $H_2S$ to vaporise and warm though heating. At the same time the cooling effect generated by such evaporation is used to cool and re-condense purified gaseous $CO_2$ returning from the $H_2S$ absorber.

The gaseous mixture of $CO_2$ and $H_2S$ is next fed to an $H_2S$ absorber preferably to the base of a tower absorber where it is contacted, suitably counter-currently, with a solvent which selectively absorbs the $H_2S$. Solvent extraction processes for effecting this separation are well known in the art and include the Rectisol™ and Selexol™ processes which respectively use refrigerated methanol and a refrigerated mixture of dimethyl ethers of polyethylene glycol as the absorbent. Extraction is typically carried out at elevated pressure e.g. greater than 10 barg and low temperature e.g. −20 to −75° C. The purified $CO_2$ is then removed overhead from the absorption tower and retuned to the evaporator/condenser where it is re-condensed by the cooling effect generated by the vaporisation of the impure liquid $CO_2$ feed. The liquid so produced can then be scrubbed for a final time to yield pure liquid $CO_2$ for export offsite. As regards the contaminated solvent produced in the $H_2S$ absorber, this is removed from the base of the absorber and optionally treated in a stripper column to remove a gaseous $H_2S$ stream for disposal and regenerate uncontaminated solvent which can be recycled. Optionally a $CO_2$ absorber can be inserted between the absorber and the stripper column to recover any $CO_2$ in the hydrogen-rich vapour stream. In this embodiment the hydrogen-rich vapour stream exiting the gas-liquid separator is treated before being passed though the turboexpanders. The gaseous $H_2S$ stream recovered from the stripper can be treated by for example the Claus Process to recover elemental sulphur.

The liquid $CO_2$ product stream that is exported from the process of the present invention preferably comprises at least 95 mole % $CO_2$, in particular, at least 98 mole % $CO_2$, the remainder being mostly hydrogen with some inerts, for example, nitrogen and/or CO. Where the liquid $CO_2$ product stream is sequestered, it is typically delivered to a pipeline that transfers the liquid $CO_2$ product stream to a reception facility of an oil field where the liquid $CO_2$ product stream may be used as an injection fluid for an oil reservoir. If necessary, the liquid $CO_2$ product stream is pumped to above the pressure of the oil reservoir before being injected down an injection well and into the oil reservoir. The injected $CO_2$ displaces the hydrocarbons contained in the reservoir rock towards a production well for enhanced recovery of hydrocarbons therefrom. If any carbon dioxide is produced from the production well together with the hydrocarbons, the carbon dioxide may be separated from the hydrocarbons for re-injection into the oil reservoir. It is also envisaged that the liquid $CO_2$ product stream may be sequestered by being injected into an aquifer or a depleted oil or gas reservoir for storage therein.

Typically, the amount of $CO_2$ contained in the $H_2$ rich vapour stream that is obtained from the $CO_2$ condensation plant is less than 10 mole % $CO_2$, preferably, less than 5 mole % $CO_2$, more preferably, less than 2 mole % $CO_2$, in particular, less than 1 mole % $CO_2$. The $H_2$ rich vapour stream may comprise trace amounts of carbon monoxide (CO) and methane, for example, less than 500 ppm on a molar basis. The remainder of the hydrogen rich vapour stream that is obtained from the $CO_2$ condensation plant is hydrogen.

As discussed above, the $H_2$ rich vapour stream obtained from the $CO_2$ condensation plant may be used as fuel for a low pressure burner of a fired heater, or as fuel for a reformer or boiler or as a refinery feed stream for upgrading of one or more refinery streams or as a feed to a chemical process. However, it is preferred to use the $H_2$ rich vapour stream as a fuel gas stream for the combustor of at least one gas turbine of a power plant thereby producing electricity. As discussed above, an advantage of the present invention is that the fuel gas stream may be obtained at above the minimum inlet pressure for the combustor(s) of the gas turbine(s). Typically, the feed pressure for the fuel gas stream (inlet pressure for the combustor of the gas turbine(s)) is in the range of 25 to 45 barg, preferably, 28 to 40 barg, in particular, 30 to 35 barg. Typically, the combustor of the gas turbine(s) is operated at a pressure of 15 to 20 bar absolute. Accordingly, there is no requirement for a compressor to compress the fuel gas stream to the inlet pressure for the combustor(s) of the gas turbine(s). Preferably, the $H_2$ rich vapour stream is diluted with medium pressure nitrogen and/or medium pressure steam prior to being fed as fuel gas to the combustor(s) of the gas turbine(s). Accordingly, the fuel gas stream that is fed to the combustor(s) of the gas turbine(s) preferably contains 35 to 65 mole % hydrogen, more preferably, 45 to 60 mole % hydrogen, for example, 48 to 52 mole % of hydrogen.

It has been found that the expansion energy recovered from the $H_2$ rich vapour streams in the turboexpanders of the turboexpansion system (when the fuel gas stream is obtained at a pressure of about 30 barg) can reduce the net power consumption of the separation process to less than 30 MW, preferably, less than 25 MW, in particular less than 23 MW when processing 28,000 kmol/hour of synthesis gas containing 56 mol % hydrogen and 43 mol % $CO_2$. The net power consumption is defined as: [power consumption in the compression system+power consumption in the external refrigerant compression system (if used)]−power generated in the turboexpansion system].

The exhaust gas from the gas turbine(s) of the power plant is passed to a heat recovery and steam generator unit (HRSG) where the exhaust gas may be heat exchanged with various process streams. Optionally, the temperature of the exhaust gas of the gas turbine is increased by providing the HRSG with a post-firing system, for example, a post-firing burner. Suitably, the post-firing burner is fed with a portion of the hydrogen fuel stream and the hydrogen fuel stream is combusted in the burner using residual oxygen contained in the exhaust gas. Suitably, the exhaust gas is raised in temperature in the post-firing system to a temperature in the range of 500 to 800° C.

Typically, the HRSG generates and superheats steam for use in at least one steam turbine and/or in a process for generating the synthesis gas and/or for diluting the fuel gas stream. Typically, the HRSG is capable of generating high pressure (HP) steam, medium pressure (MP) steam and low pressure (LP) steam and of superheating these steam streams. The HRSG may also be capable of reheating MP steam that is produced as an exhaust stream from the high pressure stage of a multistage steam turbine. In addition, the HRSG may be used to heat boiler feed water (for example, boiler feed water that is fed to the waste heat boiler of a shift converter unit).

The cooled exhaust gas is discharged from the HRSG to the atmosphere through a stack. Preferably, the stack is provided with a continuous emission monitoring system for monitoring, for example, the NO content of the cooled exhaust gas.

In a further embodiment of the present invention there is provided a carbon dioxide condensation plant for separating carbon dioxide and a hydrogen from a synthesis gas stream containing $H_2S$ impurities, the plant comprising:

(a) means for providing a synthesis gas feed stream containing $H_2S$ impurities;

(b) a compression system for compressing the synthesis gas feed stream to a pressure in the range of 80 to 400 barg, for example 150 to 400 barg;

(c) a heat exchanger system for cooling the compressed synthesis gas stream to a temperature in the range of −15 to −55° C. against a plurality of internal refrigerant streams thereby partially condensing the compressed synthesis gas stream;

(d) a gas-liquid separator vessel for separating the partially condensed compressed synthesis gas stream into a hydrogen rich vapour stream and liquid $CO_2$ stream containing dissolved $H_2S$ with minimal pressure drop across the gas-liquid separator vessel;

(e) a turboexpander system comprising a plurality of turboexpanders arranged in series for expanding the separated hydrogen rich vapour stream to successively lower pressures wherein the turboexpander system is adapted to produce a hydrogen rich vapour stream from the final turboexpander in the series at a pressure at or above the minimum fuel gas feed pressure to the combustor of at least one gas turbine of a power plant and wherein each turboexpander in the series is adapted to provide a hydrogen rich vapour stream that is used as an internal refrigerant stream for the heat exchanger system and (f) an $H_2S$ recovery unit for removing $H_2S$ dissolved in the liquid $CO_2$ stream comprising an evaporator/condenser for evaporating and re-condensing liquid $CO_2$ and an $H_2S$ absorber adapted to remove $H_2S$ from gaseous $CO_2$ by means of solvent extraction.

As discussed above, the $CO_2$ condensation plant may optionally comprise a valve for letting down the pressure of the separated liquid $CO_2$ stream to the $CO_2$ export pressure. Accordingly, the $CO_2$ condensation plant optionally comprises a flash separation vessel for separating any hydrogen rich vapour from the reduced pressure liquid $CO_2$ stream.

Also, as discussed above, the $CO_2$ condensation plant may optionally comprise a cryogenic separation system comprising at least one cryogenic separation stage that is comprised of a heat exchanger that employs an external refrigerant and a gas-liquid separator vessel with the cryogenic separation system being operated with minimal pressure drop across the cryogenic separation stage or stages of the system. Accordingly, the gas-liquid separator vessel for separating the partially condensed compressed synthesis gas stream into a hydrogen rich vapour stream and liquid $CO_2$ stream is either the gas-liquid separator vessel of a single cryogenic separation stage or is the final gas-liquid separator vessel of a plurality of cryogenic separator vessels that are arranged in series. Where the cryogenic separation system comprises a plurality of separation stages, a liquid $CO_2$ stream will be withdrawn from the final cryogenic separation stages and additional liquid $CO_2$ streams will be withdrawn from each of the gas-liquid separator vessels of the preceding cryogenic separation stages of the series.

According to a further aspect of the invention there is provided a process for separating a gas stream containing hydrogen sulfide ($H_2S$) impurities into a hydrogen ($H_2$) rich vapour stream, a carbon dioxide ($CO_2$) stream and an $H_2S$ rich vapour stream in an apparatus that comprises a compression and/or cooling system comprising at least one compressor and/or heat exchanger and a gas-liquid separator vessel, and an $H_2S$ recovery unit the process comprising the steps of:

(a) feeding the gas stream to the compression and/or cooling system such that carbon dioxide in the gas stream condenses to form a two-phase stream;

(b) passing the two-phase stream either directly or indirectly to a gas-liquid separator vessel and withdrawing a hydrogen rich vapour stream and a liquid $CO_2$ stream containing dissolved $H_2S$ impurities from the separator vessel;

(c) passing the liquid $CO_2$ stream containing dissolved $H_2S$ impurities to an $H_2S$ recovery unit comprising an evaporator/condenser in which the $CO_2$ and $H_2S$ are vaporised and an $H_2S$ absorber in which the gaseous $H_2S$ and $CO_2$ are separated.

wherein the two phase stream passed to the separator is at a pressure of from 80 bar to 400 bar, and preferably the pressure of the H2S recovery unit is at least 30 bar.

In some applications, high pressure hydrogen rich gas may be a desirable product and the expanders might not be used.

In some examples it is preferred that the pressure of the gas-liquid separator is between 150 bar and 400 bar.

Preferably at least 50% of the carbon dioxide is separated from the mixture in step (b).

The H2S recovery unit may be at a pressure of at least 50 bar, for example 50 to 70 bar.

Preferably the process includes separating further carbon dioxide from the hydrogen rich vapour stream using a physical solvent system wherein the solvent system is at a pressure of at least 60 bar. The pressure of the CO2 solvent system may be between 80 bar and 400 bar.

Preferably the CO2 solvent system and the H2S recovery unit share common solvent.

The process may further include the step of feeding at least a part of the liquid carbon dioxide stream from the separator to a heat exchanger for exchanging heat within the system. Thus the carbon dioxide liquid stream may be used as an indirect refrigerant within the system, for example exchanging heat with another process stream of the system.

Preferably the carbon dioxide at least partly evaporates at or upstream of the heat exchanger. By evaporation of the carbon dioxide, additional cooling can be provided within the system. For example the carbon dioxide stream may be flashed, for example across a valve, upstream of or at a heat exchanger. In other arrangements the carbon dioxide may be used as a coolant in liquid form. This feature of use of the carbon dioxide stream as an internal coolant may be provided as a part of any of the examples described herein and may be provided in relation to any one of the aspects herein. At least a part, or all, of the liquid carbon dioxide stream may be used as an internal coolant.

The process may include the step of feeding the hydrogen rich vapour stream from the separator to an expander system wherein the hydrogen rich vapour stream is expanded, the expander system including at least one heat exchanger for exchanging heat within the system and at least one expander capable of recovering mechanical work.

An aspect of the invention also provides an apparatus for separating a gas stream containing hydrogen sulfide ($H_2S$) into a hydrogen ($H_2$) rich vapour stream, a carbon dioxide ($CO_2$) stream and an $H_2S$ rich vapour stream, the apparatus including a compression and/or cooling system comprising at least one compressor and/or heat exchanger arranged for cooling the gas stream such that carbon dioxide in the gas stream condenses to form a two-phase stream;

a gas-liquid separator vessel arranged downstream of the compression and/or cooling system for separating the two-phase stream into a hydrogen rich vapour stream and a liquid $CO_2$ stream containing dissolved $H_2S$ impurities;

an $H_2S$ recovery unit downstream of the separator, comprising an evaporator/condenser for vaporizing $CO_2$ and $H_2S$ and an $H_2S$ absorber for separating the $H_2S$ and $CO_2$ wherein the apparatus is such that the two phase stream is passed to the separator at a pressure of from 80 bar to 400 bar, and the pressure of the H2S recovery unit is at least 30 bar.

Each feature of the invention described herein may be provided independently or in any appropriate combination. In particular, features described herein in relation to one aspect of the invention may be provided in other aspects. Features of method aspects may be applied to apparatus aspects.

The process and apparatus of the present invention will now be illustrated by reference to FIG. 1.

FIG. 1 shows a detailed process flow diagram for a first embodiment of the process and $CO_2$ condensation plant of the present invention. A dry synthesis gas stream containing $H_2S$ impurities 1 is fed at a pressure of 60 barg and a temperature of 40° C. to a compression system comprising a first low pressure (LP) compressor C1, a second low pressure (LP) compressor C2, a first high pressure (HP) compressor C3 and a second HP compressor C4 that are arranged in series (i.e. four stages of compression). The first and second LP compressors, C1 and C2 respectively, are arranged on a common drive shaft. Similarly, the first and second HP compressors, C3 and C4 respectively, are arranged on a common drive shaft.

The low pressure synthesis gas stream 1D that exits the first LP compressor C1 is at a pressure of 94 bar and a temperature of 84.62° C., the increase in temperature arising from heat of compression. Stream 1D is then cooled in heat exchanger E1 against a cold stream (for example, water or air) and is passed to the second LP compressor C2 thereby generating a second LP synthesis gas stream 2D having a pressure of 147.0 bar and a temperature of 84.21° C. Stream 2D is then cooled in heat exchanger E2 against a cold stream (for example, water or air) and is passed to the first high pressure (HP) compressor C3 thereby generating a first high pressure stream 3D having a pressure of 230.0 barg and a temperature of 83.56° C. Stream 3D is then cooled in heat exchanger E3 against a cold stream (for example, water or air) and is passed to the second HP compressor C4 thereby forming a second HP synthesis gas stream 4D having a pressure of 360.0 barg and a temperature of 82.25° C. Stream 4D is then cooled in heat exchanger E4 against a cold stream (for example, water or air) thereby generating HP synthesis gas stream S1 having a temperature of about 40° C. The person skilled in the art would understand that the number of compression stages has been optimised to minimise power consumption and that compression from 60 to 360 barg could also have been achieved using two or three compression stages. The person skilled in the art would also understand that the pressure of the synthesis gas exiting each compression stage can be varied. However, the discharge pressure from the final stage of compression determines the amount of carbon dioxide that is captured from the synthesis gas stream. The person skilled in the art will also understand that the HP synthesis gas may be cooled in heat exchanger E4 against an external refrigerant, for example, propane, propylene or ammonia, to a temperature in the range of 0 to −30° C. thereby reducing the cooling duty for the multichannel heat exchanger LNG-100.

HP synthesis gas stream S1 is then passed through multichannel heat exchanger LNG-100 where it is cooled against a plurality of cold process stream (see below) thereby generating a cooled HP synthesis gas stream S2 having a pressure of 358.5 bar and a temperature of −21.33° C. (where stream S1 has a temperature of about 40° C.).

Stream S2 is passed directly to gas-liquid separator vessel F360 where a hydrogen rich vapour phase separates from a liquid $CO_2$ phase. Accordingly, a hydrogen rich vapour stream S2V is removed overhead from separator vessel F360 and fed via line 23 to a $CO_2$ absorber unit A3. In A3 the hydrogen rich vapour is contacted countercurrently with liquid methanol delivered via line 25 at a temperature of −40° C. in order to remove any residual $CO_2$ and $H_2S$ contained therein. After contact the methanol now rich is n.$CO_2$ is removed from A3 and fed to the $H_2S$ absorber A1 via line 18 (see below). The treated hydrogen-rich vapour is removed from A3 via line 1N and then routed to expander EX1 where it is expanded to lower pressure. The person skilled in the art would understand that isentropic expansion of the vapour stream results in cooling. Accordingly, stream 1T exits the expander EX1 at a pressure of 205.0 barg and a temperature of −26.25° C. and is routed through multichannel heat exchanger LNG-100 where it is heat exchanged with HP synthesis gas stream S1 thereby cooling the HP synthesis gas stream S1. $H_2$ rich vapour stream 2N exits the multichannel heat exchanger LNG-100 and is passed to expander EX2 where the vapour stream is expanded to lower pressure. $H_2$ rich vapour stream 2T exits the expander at a pressure of 112.0 barg and a temperature of −26.01° C. and is passed to manifold M1. A liquid $CO_2$ stream S2L is withdrawn from the bottom of separator vessel F360 and is flashed across valve VLV-109 thereby generating a further two phase stream 18 that is passed to flash vessel F150. $H_2$ rich vapour stream S2LV that is withdrawn from the top of flash vessel F150 is routed to manifold M1 where is it combined with $H_2$ rich vapour stream 2T to form combined vapour stream 2TM. Vapour stream 2TM is then passed through multichannel heat exchanger LNG-100 thereby cooling HP synthesis gas stream S1. $H_2$ rich vapour stream 3N that exits the multichannel heat exchanger LNG-100 is then passed to expander EX3 where it is expanded to lower pressure. Vapour stream 3T exits expander EX3 at a pressure of 65.0 barg and a temperature of −24.56° C. and is passed through multichannel heat exchanger LNG-100 thereby cooling HP synthesis gas stream S1. $H_2$ rich vapour stream 4N is then passed to expander EX4 where it is expanded to lower pressure. $H_2$ rich vapour stream 4T exits expander EX4 at a pressure of 31.0 barg and a temperature of −24.59° C. and is passed through multichannel heat exchanger LNG-100 thereby cooling HP synthesis gas stream S1. The final $H_2$ rich vapour stream that exits the multichannel heat exchanger LNG-100 via line 29 has a pressure of 30.5 barg and a temperature of 37.00° C. This vapour stream comprises 88.42 mole % $H_2$ and 9.30 mole % $CO_2$ and, after dilution with medium pressure $N_2$ and/or medium pressure steam, may be passed as hydrogen fuel gas to the combustor(s) of the gas turbine(s) of a Power Island (not shown). The person skilled in the art will understand that the number of expanders can be increased or decreased (minimum of two expanders). The person skilled in the art will also understand that the operating pressure and temperature of the expanders can also be varied provided that the vapour stream that exits the multichannel heat exchanger has a pressure of at least 30 barg. The expanders EX1, EX2, EX3 and EX4 may be connected to electric motors to recover energy and the electricity may be either used in the process or is exported from the process. Alternatively, the expanders may be directly coupled to the compressors, for example, by mounting the expanders and compressors on a common shaft so that the isentropic expansion of the hydrogen rich vapour in the expanders is used to turn the common shaft and drive the compressors. Accordingly, the net power consumption for the flow scheme of FIG. 1 is 22.94 MW. An advantage of the flow scheme of FIG. 1 is that the $H_2$ fuel gas stream that exits LNG-100 is above the operating pressure of the combustor(s) of the gas turbine(s) of the Power Island thereby allowing the omission of a hydrogen compressor.

A liquid $CO_2$ stream containing $H_2S$ impurities S2LL is withdrawn from the bottom of flash vessel F150 and passed through multichannel heat exchanger LNG-100 where it is used to cool HP synthesis gas stream S1. This stream exits the multichannel heat exchanger LNG-100 at a temperature of 24° C. and a pressure of 149.5 barg via line 14 and is fed to evaporator/condenser E5 through expander EX5 where it is subject to expansion and vaporisation. Depending on the cold heat requirement of LNG100, this EX5 may be located prior to LNG100 in line S2LL for higher cooling effect in LNG100.

The gaseous mixture of $CO_2$ and $H_2S$ so produced leaves E5 at a pressure of around 50 barg and is fed via line 15 to $H_2S$ absorber A1 where it is countercurrently contacted with liquid methanol at a temperature of around −40° C. The liquid methanol which is supplied to A1 via line 18 is rich in $CO_2$ and originates from the $CO_2$ absorber A3 (see above). In A1 the $CO_2$ rich methanol solvent discharges its $CO_2$ into the bulk of the $CO_2$ which is being treated. Via line 16 a stream of purified $CO_2$ is removed from A1 and returned to E5 where it is cooled and liquefied though heat exchange with the contents of line 14 which are being evaporated. The spent methanol solvent (rich in $H_2S$) is removed from A1 via line 27 and fed to separator A4 where any final amounts of $CO_2$ are removed overhead and recycled to A1 via line 28. The remaining spent methanol solvent is then fed via line 26 to the head of a stripper column A2 in which the $H_2S$ and the methanol are separated. An $H_2S$ rich gas stream is then removed overhead via line 20 for optional further treatment e.g. in a Claus Plant. Lean methanol is then returned to A3 via line 25. A2 is provided with a reboiler serviced by lines 21 and 22 to maintain the methanol at the correct temperature.

The invention claimed is:

1. A process for separating a synthesis gas stream containing hydrogen sulfide ($H_2S$) impurities into a hydrogen ($H_2$) rich vapor stream (34) and a liquid carbon dioxide ($CO_2$) stream in a $CO_2$ condensation plant that comprises (a) a compression system comprising at least one compressor, (b) a heat exchanger system, (c) a gas-liquid separator vessel, (d) a turboexpansion system comprising a plurality of turboexpanders arranged in series and (e) an $H_2S$ recovery unit the process comprising the steps of:
    (A) feeding the synthesis gas stream at a pressure in the range of 10 to 60 barg to the compression system of the $CO_2$ condensation plant such that the synthesis gas is increased in pressure to a pressure in the range of 150 to 400 barg and cooling the resulting high pressure (HP) synthesis gas stream against an external coolant and optionally an external refrigerant to remove at least part of the heat of compression;
    (B) cooling the HP synthesis gas stream formed in step (A) to a temperature in the range of −15 to −55° C. by passing the HP synthesis gas stream through the heat exchanger system in heat exchange relationship with a plurality of internal refrigerant streams wherein the internal refrigerant streams are selected from the group consisting of cold hydrogen rich vapour streams and liquid $CO_2$ streams;
    (C) passing the cooled HP synthesis gas stream formed in step (B) to a gas-liquid separator vessel that is operated at the same pressure as the heat exchanger system and withdrawing a high pressure (HP) hydrogen rich vapor stream from at or near the top of the separator vessel and a high pressure (HP) liquid $CO_2$ stream containing dissolved $H_2S$ impurities from at or near the bottom of the separator vessel;

(D) feeding the HP hydrogen rich vapor stream from step (C) to the turboexpansion system wherein the HP hydrogen rich vapor stream is subjected to isentropic expansion in each of the turboexpanders of the series such that hydrogen rich vapor streams are withdrawn from the turboexpanders of the series at reduced temperature and at successively reduced pressures and wherein isentropic expansion of the HP hydrogen rich vapor in each of the turboexpanders of the series is used to drive a compressor of the compression system and/or to drive a turbine of an electric generator and (E) passing the HP liquid $CO_2$ stream containing dissolved $H_2S$ impurities from step (C) to an $H_2S$ recovery unit comprising an evaporator/condenser in which the HP liquid $CO_2$ stream containing dissolved $H_2S$ impurities is vaporized and wherein purified $CO_2$ is condensed and an $H_2S$ absorber in which the gaseous $H_2S$ and $CO_2$ are separated to form purified gaseous $CO_2$.

2. A process as claimed in claim 1, wherein at least 50% of the carbon dioxide is separated from the cooled HP synthesis gas stream in step (C).

3. A process according to claim 1, wherein the H2S recovery unit is at a pressure of from 50 bar.

4. A process as claimed in claim 1, wherein the pressure drop across the heat exchanger system in step (B) is less than 1.5 bar.

5. A process as claimed in claim 1, wherein the heat exchanger system comprises a multichannel heat exchanger and the HP synthesis gas stream is passed through a channel in the multichannel heat exchanger in heat exchange relationship with a plurality of internal refrigerant streams that are passed through further channels in the multichannel heat exchanger.

6. A process as claimed claim 1, wherein the heat exchanger system comprises a plurality of stand-alone heat exchangers arranged in series and the HP synthesis gas stream is cooled in step (B) as it is passed through the heat exchangers of the series by heat exchange with a plurality of internal refrigerant streams that are fed to the first and successive heat exchangers of the series at successively lower temperatures.

7. A process as claimed in claim 1, wherein the HP synthesis gas stream formed in step (A) is cooled to a temperature in the range of −15 to −55° C. in step (B) by heat exchange with a plurality of internal refrigerant streams selected from the group consisting of cold hydrogen rich vapor streams and liquid CO2 streams.

8. A process as claimed in claim 1, wherein the hydrogen rich vapor stream that exits the final turboexpander in step (D) is obtained at a pressure in the range of 1 to 200 barg.

9. A process as claimed in claim 1, wherein the hydrogen rich vapor stream that exits the final turboexpander in step (D) is obtained at a pressure in the range of 25 to 45 barg, and is passed as fuel gas to a combustor of at least one gas turbine of a power plant.

10. A process as claimed in claim 1, wherein the cooled HP synthesis gas stream formed in step (B) has a temperature in the range of −30 to −40° C. and is passed to a cryogenic separation system that comprises a single cryogenic separation stage comprised of a heat exchanger that employs an external refrigerant and a gas-liquid separator vessel wherein the pressure drop across the cryogenic separation stage is in the range of 0.1 to 5 bar; the heat exchanger of the cryogenic separation stage has an operating temperature in the range of −40 to −55° C.; and wherein the HP hydrogen rich vapor stream and the HP liquid CO2 stream of step (C) are withdrawn from the gas-liquid separator vessel of the cryogenic separation stage.

11. A process as claimed in claim 1, wherein the cooled HP synthesis gas stream that is formed in step (B) has a temperature in the range of −15 to 30° C. and is passed to a cryogenic separation system comprising a plurality of cryogenic separation stages that are arranged in series; the cryogenic separation stages of the series are operated at progressively lower temperatures and with a pressure drop across the series of cryogenic separation stages in the range of 0.1 to 5 bar; the HP hydrogen rich vapor stream and the HP liquid $CO_2$ stream of step (C) are withdrawn from the gas-liquid separator vessel of the final cryogenic separation stage in the series; and additional HP liquid $CO_2$ streams are withdrawn from each of the preceding cryogenic separation stages in the series.

12. A process as claimed in claim 1, wherein the synthesis gas stream is compressed in the compression system to a pressure in the range of 175 to 360 barg.

13. A process as claimed in claim 1, wherein the synthesis gas is compressed in a multistage compressor system comprising a plurality of compressors arranged in series wherein a heat exchanger is provided after each compressor of the series and wherein the synthesis gas is cooled in each heat exchanger against an external coolant selected from the group consisting of air, water or a cold process stream selected from the high pressure (HP) hydrogen rich vapor stream formed in step (C) or the hydrogen rich vapor streams withdrawn from the turboexpanders of the series from step (D).

14. A process as claimed in claim 1, wherein the H2S absorber effects removal of H2S in step (E) by means of solvent extraction.

15. A process as claimed in claim 14, wherein the solvent is refrigerated methanol or a refrigerated mixture of dimethyl ether of polyethylene glycol.

16. A process as claimed in claim 1, comprising an additional step of (F) prior to step (D) comprising contacting the high pressure (HP) hydrogen-rich vapor stream from step (C) with a solvent in a CO2 absorber to remove any residual CO2 and H2S contained therein.

17. A process as claimed in claim 16 where the H2S absorber and the CO2 absorber are integrated and share the same solvent.

18. A process according to claim 16 wherein the CO2 absorber is at a pressure of at least 60 bar.

* * * * *